(12) United States Patent
Edwards et al.

(10) Patent No.: US 9,581,020 B2
(45) Date of Patent: Feb. 28, 2017

(54) INJECTION FOR SAMPLING HEAVY OIL

(71) Applicant: Schlumberger Technology Corporation, Sugar Land, TX (US)

(72) Inventors: John E. Edwards, Muscat (OM); Adrian Rodriguez Herrera, Bracknell (GB); Morten Kristensen, Auning (DK); Tobias Judd, Lafayette, CO (US); Andrew E. Pomerantz, Lexington, MA (US); Oliver Clinton Mullins, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 274 days.

(21) Appl. No.: 14/371,990

(22) PCT Filed: Jan. 14, 2013

(86) PCT No.: PCT/US2013/021382
§ 371 (c)(1),
(2) Date: Jul. 11, 2014

(87) PCT Pub. No.: WO2013/106808
PCT Pub. Date: Jul. 18, 2013

(65) Prior Publication Data
US 2014/0353479 A1 Dec. 4, 2014

Related U.S. Application Data

(60) Provisional application No. 61/586,681, filed on Jan. 13, 2012.

(51) Int. Cl.
*E21B 29/06* (2006.01)
*E21B 43/24* (2006.01)
(Continued)

(52) U.S. Cl.
CPC ............ *E21B 49/10* (2013.01); *E21B 29/06* (2013.01); *E21B 43/24* (2013.01); *E21B 43/26* (2013.01);
(Continued)

(58) Field of Classification Search
CPC ........ E21B 49/10; E21B 49/06; E21B 49/082; E21B 36/008; E21B 36/04; E21B 43/24; E21B 43/26; E21B 49/08; G01V 8/00
See application file for complete search history.

(56) References Cited

U.S. PATENT DOCUMENTS 7,111,685 B2 9/2006 Fields
7,191,831 B2 * 3/2007 Reid ...................... E21B 49/04
166/100

(Continued)

FOREIGN PATENT DOCUMENTS

WO 2011053752 A1 5/2011

OTHER PUBLICATIONS

International Search Report for International Application No. PCT/US2013/021382 dated Apr. 30, 2013.
(Continued)

*Primary Examiner* — Daniel P Stephenson
(74) *Attorney, Agent, or Firm* — Michael Dae

(57) ABSTRACT

A downhole tool is conveyed within a borehole extending into a subterranean formation. A void is created in a sidewall of the borehole by extending a rotating member from the downhole tool into the sidewall. A portion of the sidewall surrounding the void is mechanically compressed, and the viscosity of hydrocarbons in the subterranean formation proximate the void is reduced by injecting a fluid from the downhole tool into the formation via the void. Fluid com-
(Continued)

prising the reduced viscosity hydrocarbons and the injected fluid may then be drawn from the subterranean formation into the downhole tool.

21 Claims, 9 Drawing Sheets

(51) Int. Cl.
E21B 43/26 (2006.01)
E21B 49/10 (2006.01)
G01V 8/00 (2006.01)
E21B 49/06 (2006.01)
E21B 49/08 (2006.01)

(52) U.S. Cl.
CPC ............ E21B 49/06 (2013.01); E21B 49/082 (2013.01); G01V 8/00 (2013.01)

(56) References Cited

U.S. PATENT DOCUMENTS

| 7,878,243 B2* | 2/2011 | Goodwin | E21B 49/082 166/100 |
| 7,886,825 B2* | 2/2011 | Van Hal | E21B 36/008 166/300 |
| 8,156,800 B2* | 4/2012 | Terabayashi | E21B 49/10 73/152.27 |
| 8,397,817 B2 | 3/2013 | Edwards | |
| 8,408,296 B2 | 4/2013 | Edwards | |
| 2004/0104341 A1* | 6/2004 | Betancourt | E21B 47/10 250/255 |
| 2005/0279499 A1* | 12/2005 | Tarvin | E21B 49/10 166/264 |
| 2005/0284629 A1* | 12/2005 | Reid | E21B 49/04 166/264 |
| 2006/0000606 A1* | 1/2006 | Fields | E21B 49/06 166/264 |
| 2006/0137873 A1* | 6/2006 | Caudwell | G01N 11/16 166/252.5 |
| 2007/0171414 A1 | 7/2007 | Vannuffelen et al. | |
| 2008/0066904 A1* | 3/2008 | Van Hal | E21B 36/008 166/250.1 |
| 2008/0078581 A1* | 4/2008 | Goodwin | E21B 49/10 175/50 |
| 2008/0156486 A1* | 7/2008 | Ciglenec | E21B 49/10 166/250.15 |
| 2009/0008079 A1 | 1/2009 | Zazovsky et al. | |
| 2009/0255669 A1 | 10/2009 | Ayan et al. | |
| 2010/0089573 A1* | 4/2010 | Vittoratos | E21B 43/20 166/270.1 |
| 2011/0061439 A1 | 3/2011 | Dong et al. | |
| 2014/0353479 A1* | 12/2014 | Edwards | E21B 49/06 250/255 |

OTHER PUBLICATIONS

International Preliminary Report on Patentability issued in PCT/US2013/021382 on Juy 15, 2014. 10 Pages.
Office Action issued in RU 2014133159 on Oct. 22, 2015 6 pages.

* cited by examiner

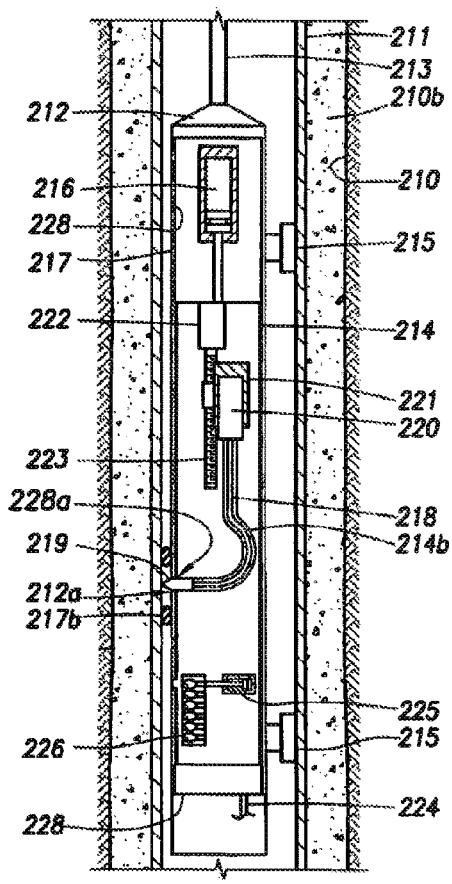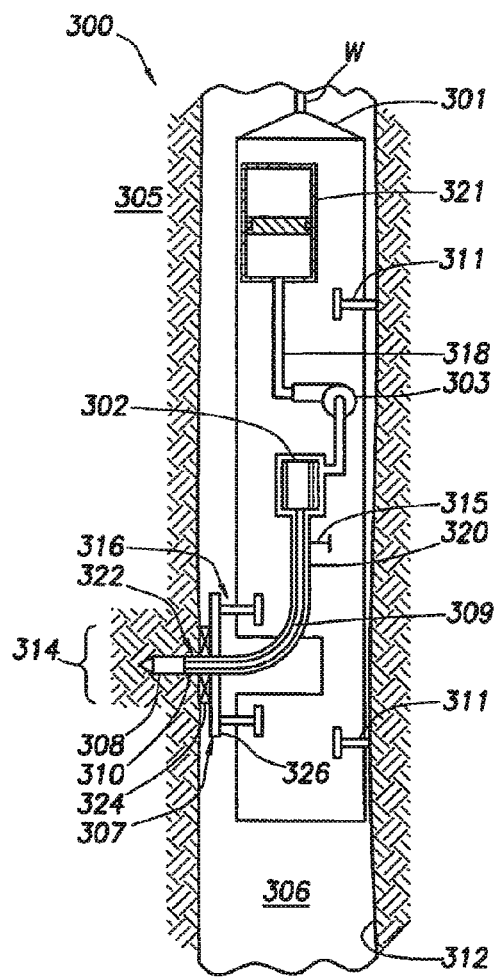
FIG. 5
FIG. 6

INJECTION FOR SAMPLING HEAVY OIL

BACKGROUND OF THE DISCLOSURE

Reservoirs containing heavy oil (e.g., oil having a viscosity above 1500 cP at reservoir temperature) sometimes have compositional gradients. Where such reservoirs are thick (e.g., having a vertical extent exceeding 25 meters), the effect of the compositional gradients may be amplified. For example, the compositional gradients may cause changes in viscosity as a function of depth, perhaps changes having several orders of magnitude. Therefore, modeling reservoir response to thermal stimulation, solvent flood, and/or other oil recovery mechanisms can be difficult without sufficient knowledge of the compositional gradients, including any breaks in the trend of compositional gradients that may indicate compartmentalization within the reservoir.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 5 is a schematic view of apparatus according to one or more aspects of the present disclosure.

FIG. 6 is a schematic view of apparatus according to one or more aspects of the present disclosure.

DETAILED DESCRIPTION

Figure 1:
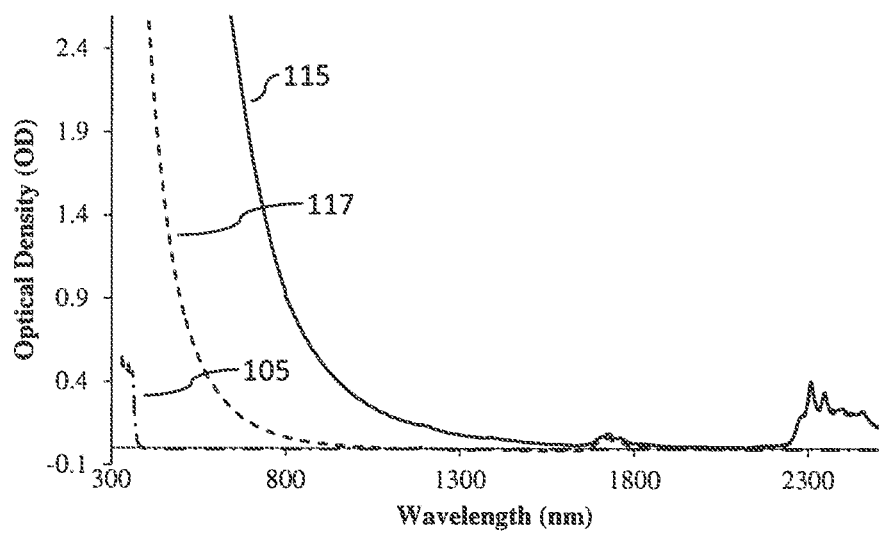
FIG. 1 is a graph demonstrating one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed except where specifically noted as indicating a relationship.

The present disclosure introduces injecting a fluid into a formation that has very low mobility, such as solvent into a heavy oil reservoir with a low ratio of permeability to fluid viscosity, to subsequently recover a reduced viscosity mixture of solvent and heavy oil into a downhole tool. Properties of the oil may then be measured without being affected by the solvent.

Heavy oils are often found in shallow permeable formations. However, as a result of the high oil viscosities, these formations exhibit low mobility. The formation mobility is related to the permeability (k) and fluid viscosity ($\mu$) with the ratio $k/\mu$. To dissolve enough heavy oil (e.g., perhaps about several liters) in a short enough time to make sampling practical, a large oil-filled formation surface area may be exposed to the solvent. The injected solvent will dissolve the heavy oil by diffusion, convection and/or other processes. The progression of the diffusion front may be easily predicted. For example, a progression of 2 mm into the formation from the void may result from two (2) liters of injection fluid diffusing into a one (1) square meter of fractured formation over several hours.

Delivering the solvent may be via a downhole tool having a sealing pad that is urged against the sidewall of the borehole extending into the formation. The downhole tool may include a drill bit, coring bit, and/or other rotating member extendable from the center of the sealing pad to create a void in the formation through the sidewall of the borehole. The void may be pencil-sized if a thin drill bit is utilized to create the void, but may be larger in diameter if a larger drill bit or a coring bit is utilized to create the void. After creating the void, the extendable rotating member (e.g., the drill bit or coring bit) may be retracted while maintaining a seal around the void with the sealing pad, or a different sealing pad may be positioned around the opening of the void, to exert mechanical pressure on the sidewall portion adjacent the void opening. A solvent and/or other injection fluid carried by a chamber of the downhole tool may then be injected into the formation via the void.

The surface area of the void created in the borehole sidewall may be insufficient for the solvent to access enough of the heavy oil in the formation. For example, where a thin drill bit is utilized to form the void, the void may be about 15 cm deep and have a diameter of about 1 cm, resulting in a surface area of about 47.9 cm². In such cases, among others within the scope of the present disclosure, the injection pressure may exceed the fracture gradient of the formation. As a result, microfractures and/or other fractures (hereafter collectively referred to simply as "fractures") may be created, extending from the void into the adjacent portion of the formation. For example, the injection pressure may be selected such that the surface area exposed to the injection fluid increases to about 1 m², although other exposure area sizes are also within the scope of the present disclosure.

As the injection fluid diffuses into the formation surrounding the void, the injection fluid will reduce the viscosity of a volume of hydrocarbons (hereafter referred to simply as "oil" or "heavy oil") beyond the invaded zone, thus avoiding emulsions with the shallow invasion of drilling fluid, should such invasion exist. A sample (e.g., several liters) of the resulting mixture of injection fluid and reduced viscosity oil may then be recovered by pumping back into the downhole tool via the void in the borehole sidewall. If the fluid injection was at a pressure greater than the fracture gradient of the formation, then the resulting fractures may subsequently close as the drawdown pressure drops sufficiently below the fracture closure pressure (e.g., about 1500 psi below the fracture closure pressure). Reservoir fluid flow into the downhole tool may then be possible even with the fractures closed until the volume of reduced viscosity oil and injection fluid is depleted.

The geometry of the fractures induced by the injection fluid may be controlled by modifying the near borehole stresses with the downhole tool so that fracture initiation occurs near the far end of the void, away from the intersection point of the void with the borehole. Thus, the induced fractures may extend out from the borehole without intersecting the borehole. If the induced fractures reach the borehole, the resulting hydraulic short circuit of the reservoir would mean the injection fluid would merely be injected into the borehole, such that the subsequently sampled fluid would substantially comprise drilling fluid instead of oil from the formation. The near borehole stresses, which are already perturbed by the presence of the borehole, may be further altered with the superposition of two induced stresses from the downhole tool: the mechanical pressure of the sealing pad, and the hydraulic pressure from the injected fluid. The void may be drilled from the center of the sealing pad to a depth about equal to the diameter of the borehole. Fractures initiating at this distance from the borehole are located partially through the near borehole perturbed stress field. Fractures starting at this position may propagate in the direction of reducing minimum stress, which is away from the borehole to the far field. Thus, in conjunction with the fracture breakdown injection pressure, pressure applied by the sealing pad to the borehole sidewall portion surrounding the opening of the void may be sufficient to ensure the tangential stress inside the void reaches the formation tensile strength near the end of the void. A balance of mechanical and hydraulic pressure may depend on the far field stresses in the formation, the extent of stress perturbation caused by the borehole, and the formation strength. Example downhole tools that may be utilized for this method, such as those described below (whether utilized independently or in combination), may have the capacity to provide this combination of mechanical and hydraulic pressure sufficient to create the induced fractures desired.

From the relationship between the different stresses caused and altered by the sealing pad of the downhole tool and the injection fluid, achieving tensile failure by hydraulic force into the void in the borehole sidewall may entail minimizing hoop stress towards tension. For example, this may occur in response to the increase in the injection pressure and the stress contrast, which is the difference between the maximum and minimum stresses in a plane perpendicular to the void. The increase in injection pressure may be constant along the void in the borehole sidewall, such that the change in stress contrast surrounding the void may determine the location of the onset of failure. When the plane perpendicular to the void touches the circumference of the borehole, the maximum stress becomes hoop stress and the minimum stress becomes the borehole axial stress. Because there is no confinement to formation movement into the borehole, the difference between the hoop and axial stresses may be large. This will be the position along the void where the difference between the maximum and minimum stresses in the plane perpendicular to the void reaches a maximum, such that the tensile failure will occur at the intersection of the void and the borehole (e.g., the opening of the void). Thus, if the Poisson's ratio of the formation is isotropic, the addition of the sealing pad force normal to the borehole circumference will increase the maximum and minimum stresses in the plane perpendicular to the void by the same amount. Consequently, the relative difference between the maximum and minimum stresses in the plane perpendicular to the void may decrease, thereby protecting this section of the void from tensile failure. The effect of the sealing pad force decreases away from the borehole, such that the point of maximum contrast between the maximum and minimum stresses in the plane perpendicular to the void where the tensile failure starts is moved along the void away from the borehole.

The downhole tool may also be oriented in the borehole such that the void created in the borehole sidewall is in the plane containing the two highest principle stresses. The induced fractures may then be in the same plane as the void. This orientation may reduce the pressure drop between the induced fractures, the void, and the downhole tool when the mixture of injection fluid and reduced-viscosity oil is drawn back into the downhole tool.

Moreover, basins submitted to thrust or strike slip may create stress anisotropy that may cause elongation of the void. This may be utilized to orient the downhole tool, such as by utilizing tandem density tools, to acquire acceptable logs in the gauge short axis that is also the direction of the maximum horizontal stress. Orienting the downhole tool into the short axis may be achieved by, for example, combining it with a density tool at 90 degrees, and opening the density tool first, which will naturally orient with the long axis before setting the drilling/coring bit of the downhole tool into the short axis.

When the injection fluid is injected at pressures above hydrostatic pressure, the formation itself may provide the seal, instead of the mud cake as with conventional drawdown methods. The incremental pressure field from the injected fluid and the induced fractures is a function of the formation permeability, as well as the viscosity of the reservoir and the injection fluid. This pressure field may intersect and leak into the borehole wherever it exceeds the hydrostatic pressure outside the perimeter of the sealing pad. For example, experimental results for an injection fluid having a viscosity of 1 cP injected into a formation having a permeability of 1 Darcy containing oil having a viscosity of 1 cP, with this conservative zero skin simulation for a 1 $m^2$ area of fractures, gave a leak off rate of 33% of the injection rate. In the low mobility formations comprising heavy oil, the leakage rate may be substantially lower.

When injecting the injection fluid, hot water, and/or other fluid(s) into the formation, it may be desirable to minimize the volume of injected contaminants. For example, if a significant volume of drilling fluid is injected preceding the injection fluid, the permeability of the induced fracture surfaces may be impaired. The volume of injected fluid preceding the injection fluid may be, for example, the volume of the void and the volume of the downhole tool internal flowline back to the formation isolation valve (behind this valve, the downhole tool internal flowline may be flushed). This total volume may be about 24 ml, although other volumes are also within the scope of the present disclosure.

It may also be possible to quantify the asphaltene context of heavy oil in the presence of the injection fluid by utilizing an oil-soluble dye and/or a solvent having a peak absorbance in the range of optical spectroscopy apparatus of the downhole tool. Asphaltene analysis may reveal compositional gradients, even when the dissolved oil sample may not be suitable for conventional PVT analysis. The injection fluid may also be selected based at least partially on compatibility with elastomer components of the downhole tool, such as those comprising VITON of DUPONT PERFORMANCE ELASTOMERS L.L.C, CHEMRAZ of GREEN, TWEED & CO., and/or nitrile, among others within the scope of the present disclosure. For example, the injection fluid may be or comprise carbon disulfide and/or dimethyl ether. The injection fluid may also partially or substantially comprise hot water, including in applications in which an internal sample chamber of the downhole tool comprises water heated by an exothermic chemical reaction and/or other internal means. The injection fluid may additionally or alternatively comprise organic solvents. Examples of the injection fluid may include one or more of toluene, benzene, xylene, acetone, pyridine, methylene chloride, pentane, hexane, heptane, diesel, kerosene, and light aromatic hydrocarbons, among others.

Figure 2:
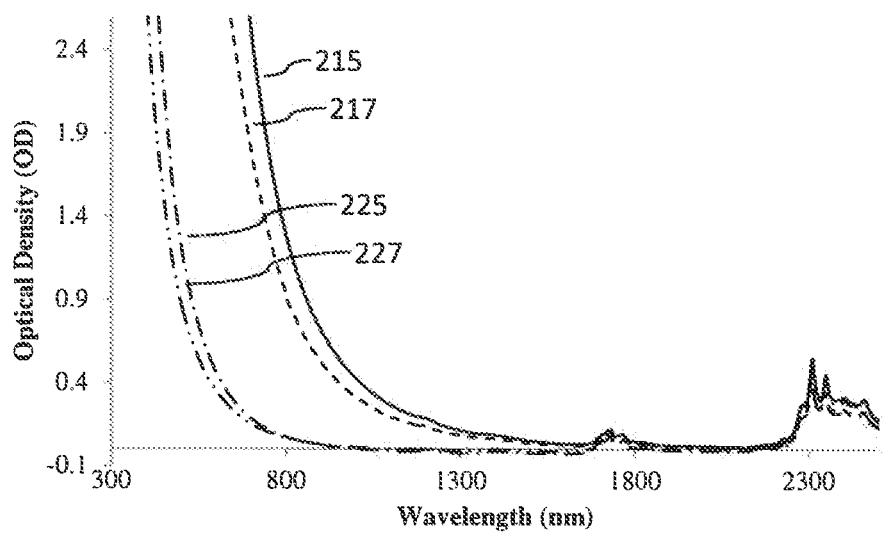
FIG. 2 is a graph demonstrating one or more aspects of the present disclosure.

Applications in which the injection fluid partially or substantially comprises carbon disulfide may be desirable for crude oil. For example, carbon disulfide is substantially transparent in the visible and near-infrared regions detected by downhole spectrometers. FIG. 1 is a chart demonstrating the spectrum of carbon disulfide 105 and two example oils 115 and 117. Both oils absorb much more strongly than carbon disulfide in the color and hydrocarbon regions. Because carbon disulfide does not absorb strongly in this region, the spectrum of an oil mixed with carbon disulfide is identical to the spectrum of the undiluted oil reduced by a constant fraction (i.e., by the same percentage at all wavelengths). Thus, the concentrations of different components in the crude oil may be estimated by measuring the spectrum of the oil diluted in the carbon disulfide. FIG. 2 is a graph depicting the spectrum 215 of the example oil 115 diluted 10% in carbon disulfide and the spectrum 217 of the undiluted oil 115 divided by 10. FIG. 2 also depicts the spectrum 225 of the example oil 117 diluted 10% in carbon disulfide and the spectrum 227 of the undiluted oil 117 divided by 10. FIG. 2 demonstrates a good agreement between the spectra of the diluted oils and the spectra of the undiluted oils (divided by 10).

If the amount of dilution is known, the absolute concentrations of different components in the crude may also be estimated by measuring the spectrum of the diluted oil. Thus, continuing with the example shown in FIGS. 1 and 2, the oil 115 has considerably more absorption in the color region than the oil 117. In the spectrum of the oils diluted in carbon disulfide, the oil 115 absorbs almost an order of magnitude more strongly than the oil 117 at 500 nm. Because it is known that absorption in the color region is proportional to asphaltene content, and because these two oils are both diluted to the same amount in carbon disulfide, the data depicted in FIG. 2 would be interpreted to suggest that the oil 115 contains an order of magnitude more asphaltene than the oil 117. This has been confirmed by experiment.

Carbon disulfide may not contain an absorption feature in the region measured by downhole spectrometry. Thus, the amount of dilution may not be estimated by measuring the spectrum of a diluted oil. However, furan and/or other materials may be utilized instead of carbon disulfide, such that the injection fluid sufficiently dissolves crude oil and contains an optical absorption feature that may allow estimation of the amount of injection fluid in the sample drawn from the formation. This may, therefore, allow estimation of the amount of dilution.

An optical dye that contains a readily measured absorption may also be added to the injection fluid, in a known amounts. Consequently, quantification of the dye by downhole spectrometry may permit an accurate estimate of the amount of dilution. Such dye may be soluble in the formation oil and the injection fluid, may be thermally stable, and/or may exhibit absorption at one or more wavelengths ranging between about 0.3 and about 2.5 microns, such as about 1 micron. Examples of such dyes may include IRA 980BY of EXCITON and NIR1031M of QCR SOLUTIONS CORP., although others are also within the scope of the present disclosure.

Having described aspects of the methodology introduced by the present disclosure, the following discussion turns to the various apparatus that may be utilized to execute one or more aspects of methods within the scope of the present disclosure. It is known that boreholes are often drilled to seek out subterranean formations (also known as downhole reservoirs) containing highly desirable fluids, such as oil, gas or water. The borehole is drilled with a drilling rig that may be located on land or over a body of water, and the borehole itself extends into the subterranean formation. The borehole may remain "open" after drilling (i.e., not lined with casing), or it may be provided with a casing (also known as a liner) to form a "cased" borehole. A cased borehole is created by inserting a string of interconnected tubular sections (i.e., joints) into an open borehole and pumping cement downhole through the center of the string tubulars. The cement flows out the bottom of the tubular string and returns towards the surface through the annulus defined between the tubular string and the sidewall of the borehole. The cement is thus employed on the outside of the tubular string to hold the string in place, to provide a degree of structural integrity, and to provide a seal between the formation and the casing.

Figure 3:
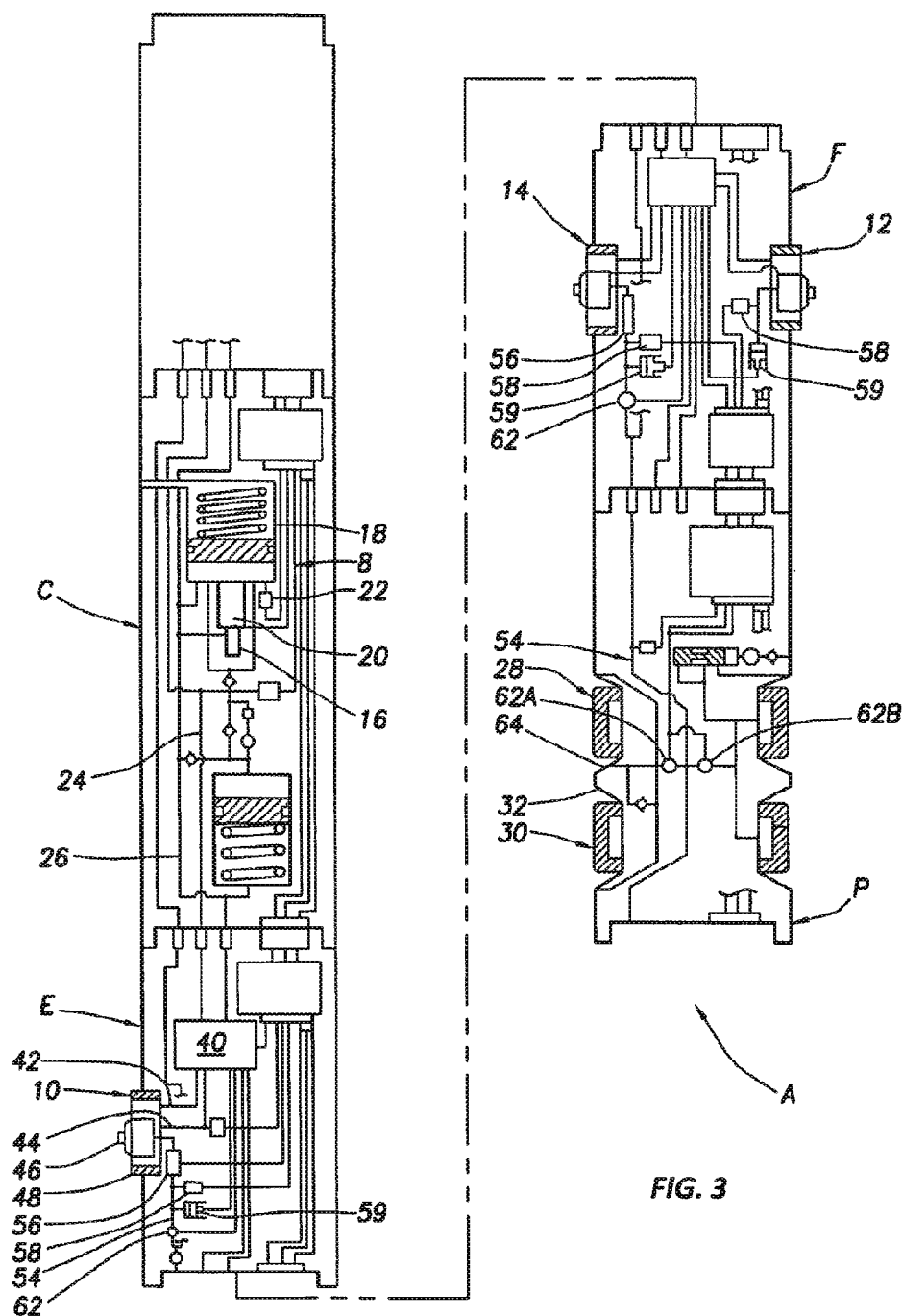
FIG. 3 is a schematic view of apparatus according to one or more aspects of the present disclosure.
Figure 4:
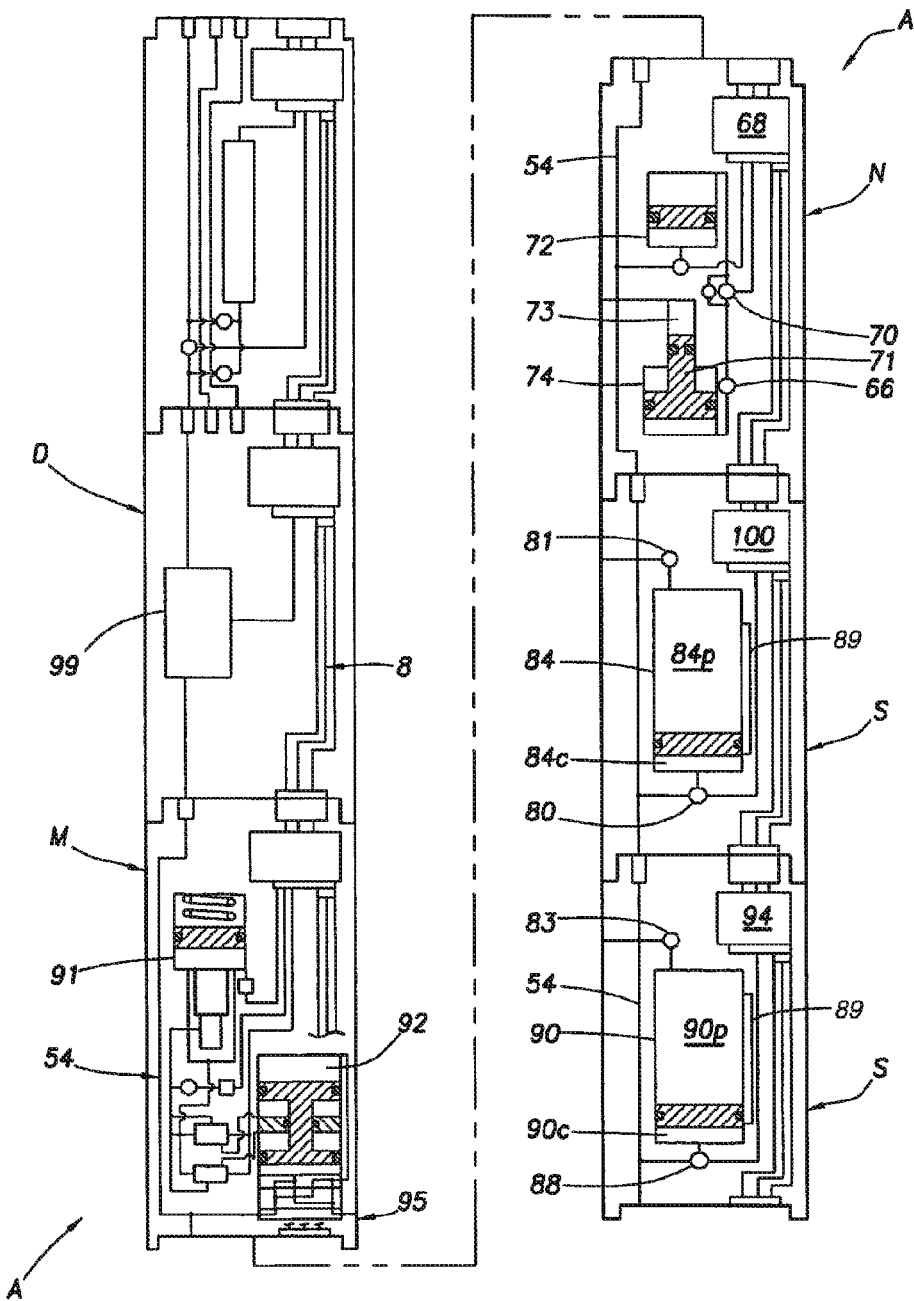
FIG. 4 is a schematic view of apparatus according to one or more aspects of the present disclosure.

FIGS. 3 and 4 illustrate a formation testing apparatus according to one or more aspects of the present disclosure. The apparatus A of FIGS. 3 and 4 is of modular construction, although a unitary tool is also within the scope of the present disclosure. The apparatus A is a downhole tool that can be lowered into the borehole (not shown) by a wireline (not shown) for the purpose of performing at least a portion of the above-described methodology. Wireline connections to the downhole tool A, as well as power supply and communications-related electronics, are not illustrated for the purpose of clarity. The power and communication lines that extend throughout the length of the downhole tool A are generally shown at 8. These power supply and communication components are known to those skilled in the art and have been in commercial use in the past. This type of control equipment may be installed at the uppermost end of the downhole tool A adjacent the wireline connection to the downhole tool A, with electrical lines running through the downhole tool A to the various components.

The downhole tool A may comprise various configurations of a hydraulic power module C, a probe module E (comprising at least one probe assembly 10), a multi-probe module F (comprising at least one sink probe assembly 14 and at least one horizontal probe assembly 12), a packer module P, a fluid analysis module D, a pump-out module M, a flow control module N, and a sample module S (two of which are shown in FIG. 4). The number and/or interconnection of these and perhaps other modules may vary within the scope of the present disclosure.

The hydraulic power module C comprises a pump 16, a reservoir 18, and a motor 20 to control the operation of the pump 16. A low oil switch 22 may exist to provide a warning to the tool operator that the oil level is low and, as such, may be utilized in regulating the operation of the pump 16.

A hydraulic fluid line 24 connected to the discharge of the pump 16 may run through the hydraulic power module C and into adjacent modules for use as a hydraulic power source. The hydraulic fluid line 24 may extend through the hydraulic power module C into the probe modules E and/or F depending upon which configuration is used. The hydraulic loop may be closed by a hydraulic fluid return line 26, which may extend from the probe module E back to the hydraulic power module C where it may terminate at the reservoir 18.

The pump-out module M may be utilized to draw fluid from the formation via the probe module E or F or the packer module P, and then pump the formation fluid into one or more sample modules S, perhaps against a buffer fluid in the sample module S. The pump-out module M may also be utilized to pump injection fluid into the formation via a void created in the borehole sidewall, as described above. The pump-out module M may also be utilized to dispose of unwanted samples by pumping fluid from a flowline 54 into the borehole, and/or to pump fluid from the borehole into the flowline 54, such as to inflate straddle packers 28 and 30.

The pump-out module M may comprise a pump 92, which may be energized by hydraulic fluid from another pump 91. The pump 92 may be operable to draw fluid from and/or pump fluid into the flowline 54, as well as to dispose of unwanted sample through a flowline 95. The pump-out module M may comprise control devices to regulate the pump 92 and/or connect flowlines (e.g., flowline 54 with flowline 95), among other functions. The pump 92 may be configured to pump injection fluid from the sample modules S and/or to pump formation fluid into the sample modules S. The pump-out module M may also be utilized to accomplish constant pressure or constant rate injection, including to pump injection fluid at a high enough rate and/or pressure so as to enable creation of fractures, as described above.

The probe assembly 10 of the probe module E may be static or selectively movable with respect to the downhole tool A. A controller 40 may control movement of the probe assembly 10, and may also be operable to connect the hydraulic flowlines 24 and 26 with additional flowlines (e.g., flowlines 42 and 44). A probe 46 may be mounted to a frame 48 that is movable with respect to the downhole tool A. The probe 46 may also be movable with respect to the frame 48. Such relative movements may also be controlled by the controller 40, for example, which may direct fluid from the flowlines 24 and 26 selectively into the flowlines 42, 44, such that the probe 46 and/or the frame 48 may be urged outwardly into contact with the borehole sidewall adjacent a void formed therein, as described above. The extension of the probe 46 and/or the frame 48 may urge the probe 46 into contact with the borehole sidewall, which may be sufficient to compress a sealing pad of the probe 46 (e.g., an elastomeric ring) against the borehole sidewall around the opening of the void formed in the borehole sidewall, thus creating a seal between the borehole and the probe 46 around the void opening. Operation of the probes 12 and 14 may be substantially similar to that of the probe 10.

The flowline 54 may extend from the probe 46 in the probe module E to the outer periphery 32 at a point between the packers 28 and 30 through the adjacent modules and into the sample modules S. The vertical probe 10 and the sink probe 14 may thus allow entry of formation fluids into the sample flowline 54, perhaps including past one or more of a resistivity sensor 56, a pressure sensor 58, and a pretest mechanism 59, depending on the desired configuration. A flowline 64 may also allow entry of formation fluids into the flowline 54. The probe module F may comprise an isolation valve 62 downstream of the resistivity sensor 56, which may limit the internal flowline volume, such as may improve the accuracy of dynamic measurements made by the pressure sensor 58. The isolation valve 62 may also be opened to allow flow into the other modules via the flowline 54.

Initially obtained formation fluid samples may be contaminated, such as with mud cake and/or filtrate. Such contaminants may be purged from the sample flow stream prior to collecting samples. Thus, the pump-out module M may be utilized to initially purge contaminated fluid drawn from the formation.

The fluid analysis module D may comprise an optical fluid analyzer 99, which may be operable as described above. While flushing contaminants from the downhole tool A, formation fluid may continue to flow through the sample flowline 54 extending through adjacent modules, perhaps including the fluid analysis module D, the pump-out module M, the flow control module N, and any number of sample modules S that may be included in the downhole tool A. The sample flowline 54 may run the length of the various modules, and multiple sample modules S may exist. Alternatively, a single sample module S may be equipped with a plurality of small diameter sample chambers, for example by locating such chambers side by side and perhaps equidistant from the axis of the sample module S.

The flow control module N may comprise a flow sensor 66, a flow controller 68, a piston 71, reservoirs 72, 73 and 74, and a selectively adjustable valve 70. A predetermined sample size may be obtained at a specific flow rate by use of the equipment described above. The sample modules S may thus be utilized to collect one or more samples of the fluid delivered via the flowline 54. If one or more of the sample modules S is a multi-sample module, the flow control module N may also regulate the sample rate. For example, a valve 80 may be opened, and another valve 62, 62A, or 62B may also be opened (whichever is the control valve for the sample module), such that the formation fluid may be directed through the sample module, into the flowline 54, and into a sample collecting cavity 84c in a chamber 84 of the sample module S. The valve 80 may then be closed to isolate the sample, and the control valve of the sample module S may be closed to isolate the flowline 54. The chamber 84 may comprise the sample collecting cavity 84c and a pressurization/buffer cavity 84p. The downhole tool A may then be moved to a different location, and the process may be repeated.

Additional samples may be stored in any number of additional sample modules S. For example, where there are two sample chambers S (as illustrated in FIG. 4), and after having filled the sample collecting cavity 84c of the upper sample module S by operation of the valve 80, another sample may be stored in a sample collecting cavity 90c in a chamber 90 of the lower sample module S by opening a valve 88 connected to the sample collecting cavity 90c. The chamber 90 may also comprise a pressurization/buffer cavity 90p. It should be noted that each sample module S may comprise its own control assembly, such as is depicted in FIG. 4 as 100 and 94.

One or more of the sample collecting cavities 84c and 90c may also carry viscosity-lowering injection fluid from surface for injection into the formation via a sidewall void. The various components of other modules (e.g., one or more of the above-described pumps, flowlines, and valves) may then be utilized to inject the injection fluid from the sample collecting cavity 84c/90c into the formation. One or more of the sample modules S may also comprise a heater 89 to heat the injection fluid and/or formation fluid sample in the sample collecting cavity 84c/90c. Such heating may be resistive, chemical, and/or otherwise.

Buffer fluid, such as full-pressure borehole fluid, may be applied to the backsides of the pistons in chambers 84 and 90 to aid control of the pressure of the formation fluid being delivered to the sample modules S. For example, the valves 81 and 83 may be opened, and the pump 92 of the pump-out module M may pump the fluid in the flowline 54 to a pressure exceeding borehole pressure. This action may dampen or reduce the pressure pulse or "shock" experienced during drawdown. This "low shock" sampling method may be utilized to obtain fluid samples from unconsolidated formations, and may allow overpressuring of the sample fluid via the pump 92.

The individual modules of the downhole tool A may be constructed in a manner permitting quick connection/disconnection to/from each other. Flush connections between the modules may be used in lieu of male/female connections to avoid points where contaminants may be trapped.

Flow control during sample collection may allow different flow rates to be used. In low permeability situations, such flow control may help prevent drawing formation fluid at pressures below the bubble point and/or asphaltene precipitation point.

FIG. 5 is a schematic view of at least a portion of a downhole tool 212 according to one or more aspects of the present disclosure. The downhole tool 212 may be substantially similar to the downhole tool A shown in FIGS. 3 and 4, with the possible exceptions or additions described below. For example, although one or more of the components and/or features of the downhole tool A shown in FIGS. 3 and 4 may not be depicted in the downhole tool 212 shown in FIG. 5, it is to be understood that the downhole tool 212 may indeed comprise such components and/or features of the downhole tool A within the scope of the present disclosure. The downhole tool 212 shown in FIG. 5 may also be combined or otherwise be used in conjunction with (e.g., in the same tool string) the downhole tool A shown in FIGS. 3 and 4. Thus, although one or more of the components and/or features of the downhole tool 212 shown in FIG. 5 may not be depicted in the downhole tool A shown in FIGS. 3 and 4, it is to be understood that the downhole tool A may indeed comprise such components and/or features of the downhole tool 212 within the scope of the present disclosure.

The downhole tool 212 may be suspended by wireline 213 inside a tubular string 211 casing a borehole 210 and supported with cement 210*b*. Depth gauges may be utilized to determine displacement of the wireline 213 over a support mechanism at surface (e.g., a sheave wheel) and thus determine the depth of the downhole tool 212. The wireline length may be controlled by suitable means at surface, such as a drum and winch mechanism (not shown). The depth may also or alternatively be determined by electrical, nuclear and/or other sensors, which may correlate depth to previous measurements made in the borehole and/or to the tubular string 211. Electronic circuitry at surface (not shown) may control communications and processing circuitry for the downhole tool 212.

The downhole tool 212 comprises a generally cylindrical body 217 comprising a longitudinal cavity 228 that encloses an inner housing 214 and electronics. The downhole tool 212 also comprises a sealing pad 217*b*, as well as one or more pistons 215 and/or other means operable to urge the sealing pad 217*b* against the tubular string 211, such as to establish a pressure-tight seal between the downhole tool 212 and the tubular string 211. The one or more pistons 215 and/or similar means may also or alternatively be operable to keep the downhole tool 212 stationary relative to the tubular string 211. The sealing pad 217*b* and/or the one or more pistons 215 may be substantially similar to corresponding components of the downhole tool A shown in FIGS. 3 and 4.

The inner housing 214 is operable to move along the longitudinal axis of the downhole tool 212 within the cavity 228, such as by a piston and/or other actuator 216. Such movement of the inner housing 214 may be utilized to position means for creating the above-described sidewall void into alignment with a port 212*a* extending through a central portion of the sealing pad 217*b*. The port 212*a* may be in fluid communication with the cavity 228, such as via an opening 228*a* extending through a wall of the housing 214.

The downhole tool 212 also comprises a flexible shaft 218 operable for conveyance within a tubular guide channel 214*b*. The guide channel 214*b* extends through the housing 214 from a drive motor 220 to the opening 228*a* in the housing 214. The flexible shaft 218 comprises a drill bit 219, which is rotated by the flexible shaft 218 in response to rotation of the drive motor 220. The drill bit 219 may alternatively be a coring bit. The drive motor 220 may be secured within the inner housing 214 by a bracket 221, which may itself be secured to a translation motor 222. The translation motor 222 is operable to move the drive motor 220, such as by turning a threaded shaft 223 inside a mating nut in the bracket 221. The translation motor 222 may thus provide an axial force (i.e., weight on bit) to the drive motor 220 and the flexible shaft 218, thus controlling penetration of the drill bit 219 into the tubular string 211, the cement 210*b*, and the formation. Such configuration may allow for the creation of voids in the borehole sidewall that are substantially deeper than the diameter of the downhole tool 212. However, other means for creating voids in the borehole sidewall are also within the scope of the present disclosure, including voids that are not as deep as the diameter of the downhole tool 212.

The inner housing 214 may also comprise a flowline 224 in fluid communication between the cavity 228 (which may be open to formation and/or borehole pressure during operation) and a main flowline (not shown) running through a length of the downhole tool 212, which may allow the downhole tool 212 to be connected to one or more sample chambers, such as those described above with respect to FIGS. 3 and 4.

The inner housing 214 may also comprise a magazine, revolver, and/or other means (collectively referred to hereafter as "magazine 226") containing plugs for capping the sidewall voids after their use. For example, the piston 216 may shift the inner housing 214 to move the magazine 226 into position, aligning a piston and/or other actuator 225 with the opening 228*a*, the port 212*a*, and/or the sidewall void. The piston 225 may then urge a plug from the magazine 226 into the tubular string 211, thus resealing the sidewall void. The one or more pistons 215 may then be refracted, and the downhole tool 212 may be repositioned within the borehole to repeat the sequence.

FIG. 6 is a schematic view of a similar downhole tool 300 configured for similar operation in an open-hole borehole. The downhole tool 300 may be substantially similar to the downhole tool A shown in FIGS. 3 and 4 and/or the downhole tool 212 shown in FIG. 5, with the possible exceptions and/or additions described below. For example, although one or more of the components and/or features of the downhole tool A shown in FIGS. 3 and 4 and/or the downhole tool 212 shown in FIG. 5 are not depicted in the downhole tool 300 shown in FIG. 6, it is to be understood that the downhole tool 300 may indeed comprise such components and/or features of the downhole tool A and/or the downhole tool 212 within the scope of the present disclosure. The downhole tool 300 shown in FIG. 6 may also be combined or otherwise used in conjunction with (e.g., in the same tool string) the downhole tool A shown in FIGS. 3 and 4 and/or the downhole tool 212 shown in FIG. 5. Thus, although one or more of the components and/or features of the downhole tool 300 shown in FIG. 6 may not be depicted in the downhole tool A shown in FIGS. 3 and 4 and/or the downhole tool 212 shown in FIG. 5, it is to be understood that the downhole tool A and/or the downhole tool 212 may indeed comprise such components and/or features of the downhole tool 300 within the scope of the present disclosure.

The downhole tool 300 is configured for conveyance within a borehole 306 extending into a subsurface formation 305. For example, the downhole tool 300 may comprise a body 301 configured for conveyance within the borehole 306 via a wireline W, a drillstring (i.e., conveyed while drilling), and/or another tubular string.

The downhole tool 300 comprises a probe assembly 307 and one or more pistons and/or other means 311 operable to anchor and/or otherwise urge the probe assembly 307 against the borehole sidewall 312, including adjacent a void 310 created in the borehole sidewall 312 as described above. The probe assembly (also referred to as simply "probe") 307 may be carried by the tool body 301, and is operable to seal a portion 314 of the borehole sidewall 312. One or more pistons and/or other actuators 316 may be operable to move the probe 307 between a retracted position (not shown), for conveyance within the borehole 306, and a deployed position (as shown in FIG. 6) for sealing off the sidewall portion 314. The downhole tool 300 may also comprise a hydraulic system and/or other controllable energy source operable to power the one or more actuators 316. The probe 307 also comprises a compressible sealing pad 324 coupled to a plate 326 deployed by the one or more actuators 316, and is thus operable to create the seal between the borehole sidewall 312 and the formation 305 around the opening of the void 310. The probe 307 is further operable to apply mechanical pressure to the portion 314 of the borehole sidewall 312 adjacent the void 310 in the borehole sidewall 312.

Like the downhole tool 212 shown in FIG. 5, the downhole tool 300 comprises a flexible drilling shaft 309. The flexible shaft 309 comprises a drilling or coring bit 308, and may be driven by a motor assembly 302. The flexible shaft 309 may thus be rotated while being extended from the downhole tool 300 into the formation 305, thereby creating the void 310 in the borehole sidewall 312. As shown in FIG. 6, the flexible shaft 309 may extend through a central aperture of the sealing pad 324, such that the void 310 may be created within the sealed-off portion 314 of the borehole sidewall 312 while surrounded by the sealing pad 324.

The downhole tool 300 may also comprise a flowline 318 fluidly communicating with the formation 305, via the void 310, by way of pathways 320 and 322 defined by the one or more actuators 316 and the sealing pad 324. Thus, the flowline 318 may admit fluid from the formation 305 into the downhole tool 300. The pathways 320 and 322 may be considered to be extended components of the flowline 318. The downhole tool 300 may also comprise a pretest piston 315 connected to the flowline 320 and operable to perform pretests.

The downhole tool 300 also comprises a pump 303 operable to draw formation fluid into the downhole tool 300 via the flowline 318, as well as one or more sample chambers 321. The one or more sample chambers 321 may initially carry the above-described injection fluid for injecting into the formation 305 via the void 310, and may also receive fluid drawn from the formation 305 (e.g., via the pump 303). Where one or more of the sample chambers 321 initially carry the above-described injection fluid, and once the injection fluid has dispersed within the formation 305, the same sample chamber 321 and/or a different sample chamber 321 may receive the resulting mixture of injection fluid and reduced-viscosity oil from the formation 305.

The downhole tool 300 may also comprise one or more instruments operable to measure pressure and/or other properties or characteristics of the formation 305, and/or one or more instruments operable to analyze fluid drawn from the formation 305 into the downhole tool 300, perhaps including the above-described optical spectrometer and/or other fluid analyzer(s). As with the downhole tool 212 shown in FIG. 5, once the void 310 has been created, the flowline 318 may communicate fluid drawn from the formation 305 to these instruments for downhole evaluation, and/or for storage until the downhole tool 300 is retrieved to surface.

Such formation evaluation and sampling may be performed with multiple voids 310 at multiple depths. One or more of the voids 310 may be formed to extend through the damaged zone surrounding the borehole 306 and into the connate fluid zone of the formation 305.

Figure 7:
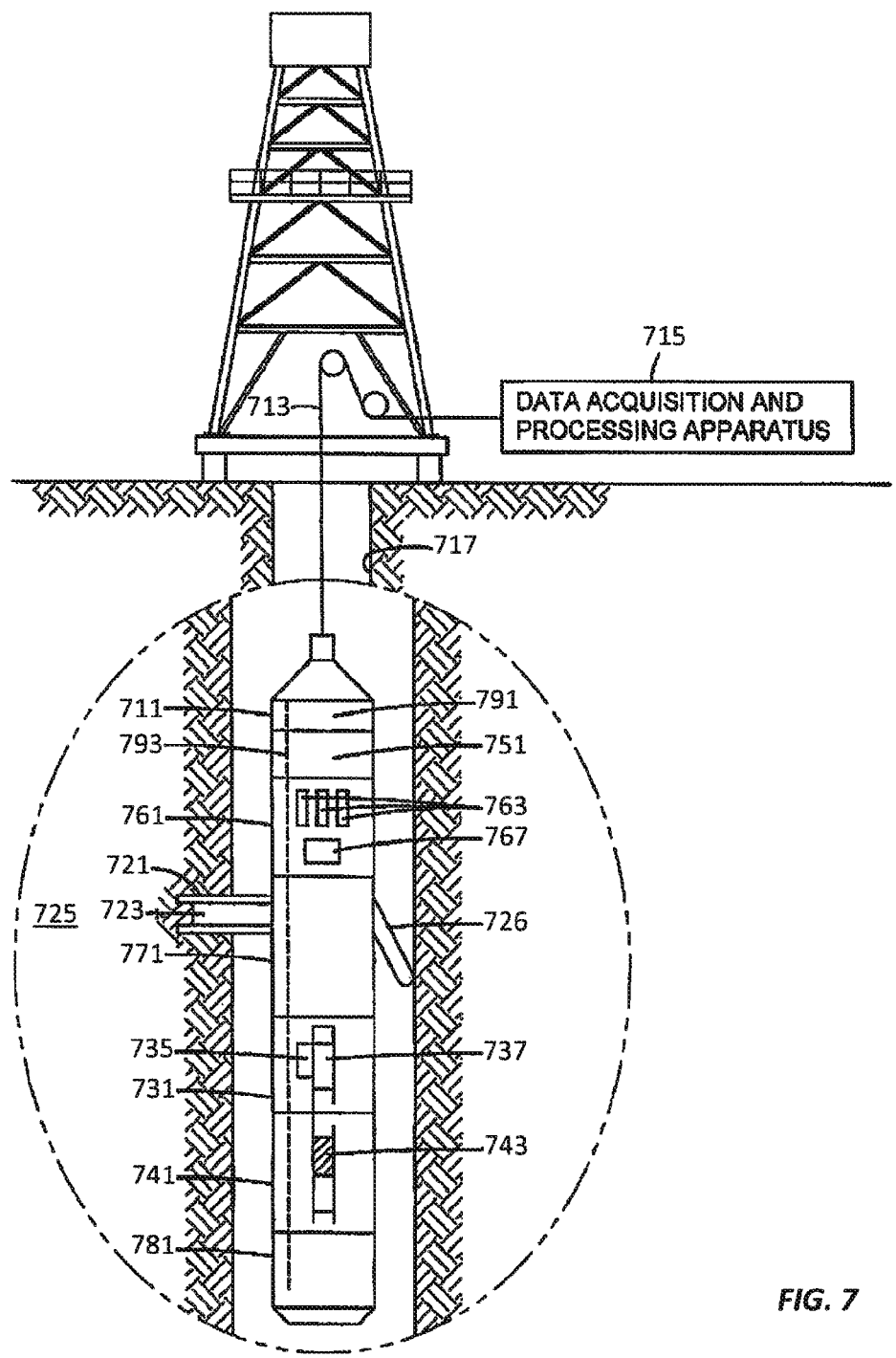
FIG. 7 is a schematic view of apparatus according to one or more aspects of the present disclosure.

FIG. 7 is a schematic view of a similar downhole tool 711 configured for similar operation in a cased or open-hole borehole. The downhole tool 711 may be substantially similar to the downhole tool A shown in FIGS. 3 and 4, the downhole tool 212 shown in FIG. 5, and/or the downhole tool 300 shown in FIG. 6, with the possible exceptions and/or additions described below. For example, although many of the components and/or features of the downhole tool A shown in FIGS. 3 and 4, the downhole tool 212 shown in FIG. 5, and/or the downhole tool 300 shown in FIG. 6 are not depicted in the downhole tool 711 shown in FIG. 7, it is to be understood that the downhole tool 711 may indeed comprise such components and/or features of the downhole tool A, the downhole tool 212, and/or the downhole tool 300 within the scope of the present disclosure. The downhole tool 711 shown in FIG. 7 may also be combined or otherwise used in conjunction with (e.g., in the same tool string) the downhole tool A shown in FIGS. 3 and 4, the downhole tool 212 shown in FIG. 5, and/or the downhole tool 300 shown in FIG. 6. Thus, although one or more of the components and/or features of the downhole tool 711 shown in FIG. 7 may not be depicted in the downhole tool A shown in FIGS. 3 and 4, the downhole tool 212 shown in FIG. 5, and/or the downhole tool 300 shown in FIG. 6, it is to be understood that the downhole tool A, the downhole tool 212, and/or the downhole tool 300 may indeed comprise such components and/or features of the downhole tool 711 within the scope of the present disclosure.

The downhole tool 711 may be utilized to remove a core 723 to form the above-described sidewall voids. The core 723 may be discarded (e.g., into the borehole 717), or it may be captured for analysis within the downhole tool 711 and/or at surface. That is, the core 723 may contain at least some pristine oil trapped in the pores of the formation 725, particularly if the formation oil has a very low mobility. Thus, the downhole tool 711 may be operable not only to perform the above-described process of injecting fluid into the formation 725 to lower the viscosity of the oil therein and subsequently collect a sample of the treated oil, but may also be operable to obtain a sample directly representative of the formation oil. For example, the core 723 may provide an aliquot of the formation oil having a composition that may represent important characteristics of the reservoir. The downhole tool 711 may further be operable to analyze this aliquot downhole or preserve it for surface analysis. The downhole tool 711 may also be operable to analyze one or more properties of the core 723 that are pertinent to the mobilization of the oil in the reservoir in which the core has been formed.

For the sake of clarity, only a few details are illustrated in FIG. 7. As in other wireline well logging operations, the downhole tool 711 may comprise one or more sensors operable to obtain geophysical measurements, and the downhole tool 711 is connected to a wireline 713 that, as with the wireline examples described above, may be or comprise a power and/or data transmission cable that connects the downhole tool 711 to data acquisition and/or processing apparatus 715 at surface. The downhole tool 711 is lowered into the borehole 717 to obtain fluid and perhaps core samples from the area surrounding the borehole 717.

The downhole tool 711 may comprise a plurality of modules and/or tools 731, 741, 751, 761, 771, and 781, which may be connected via a tool bus 793 to a telemetry unit 791. The telemetry unit 791 may, in turn, may be connected to the wireline 713 for receiving and transmitting data and control signals between the tools and the surface apparatus 715. While in the borehole 717, the modules and/or tools 731, 741, 751, 761, 771, and/or 781 may collect and send data to the surface apparatus 715 via the wireline 713. Such data may regard the one or more geological formations 725 through which the downhole tool 711 passes.

The modules and/or tools of the downhole tool 711 may comprise a control section 751, a fluid storage section 761, a sidewall coring tool 771, a core analysis section 731, a core storage section 741, and a storage cooling section 781. One or more of these modules and/or tools may be operable to perform the above-described process of injecting fluid into the formation 725 to reduce the viscosity of oil therein and subsequently collect a sample of the resulting mixture of formation oil and injection fluid.

The sidewall-coring tool 771 may be operable to acquire multiple sidewall core samples 723 and/or form multiple sidewall voids during a single trip into the borehole 717. For example, when the sidewall-coring tool 771 is positioned to a depth of interest within the borehole 717, a coring bit 721 may be operated to acquire a sidewall core 723 through the sidewall of the borehole 717. The sidewall-coring tool 771 and/or another portion of the downhole tool 711 may comprise one or more brace arms and/or other actuators 726 operable to stabilize the downhole tool 711, or at least the coring tool 771, in the borehole 717 when the coring bit 721 is functioning. The sidewall-coring tool 771 may convey the resulting core 723 to the core analysis section 731 or to the core storage section 741. Alternatively, or additionally, one or more such cores 723 may simply be jettisoned into the borehole 717.

The core analysis section 731 may comprise one or more sensors 735 that may be utilized to perform testing on a core sample 723. The one or more sensors 735 may be connected via the tool bus 793 to the telemetry unit 791 for transmission of data to the surface apparatus 715 via the wireline 713. The core analysis section 731 may additionally or alternatively comprise a core-processing chamber 737 for extracting formation oil and/or other fluid(s) from one or more cores 723, and/or for performing testing on the extracted formation oil and/or other fluid(s). Such extraction may utilize heat and/or a solvent, perhaps including the solvent injected into the formation to reduce the viscosity of the oil therein. Such extraction may additionally or alternatively utilize a grinder.

The extracted formation oil and/or other fluid(s) may be conveyed into a fluid storage chamber 763 disposed in the fluid storage section 761, which may comprise several such chambers 763. The fluid storage section 761 may also comprise a bidirectional pump and/or other fluid transfer means 767 operable to circulate fluid between the fluid storage section 761 and the core analysis section 731. Additionally, or alternatively, one or more downhole sensors (not shown) may be provided in conjunction with the fluid storage section 761, which may be utilized to analyze extracted formation oil and perhaps determine one or more physical properties such as density, viscosity, and phase borders, and/or chemical composition. For example, such downhole sensors may include optical spectrometry means as described above.

The core storage section 741 is operable to store one or more cores 723. For example, each core 723 may be individually sealed from borehole fluids in an individual container 743. Such individual containers 743 may be utilized to obtain (downhole or at surface) a fluid captured within the core 723, which may be representative of the formation oil and/or other reservoir fluid(s).

The core storage section 741 may be maintained at a desirable temperature by the core cooling section 781. Such cooling may be utilized to obtain (downhole or at surface) a fluid captured within the core 723, which may be representative of the formation oil and/or other reservoir fluid(s).

The control section 751 is operable to control at least some operations of the plurality of modules and/or tools 761, 771, 731, 741, and/or 781 from commands received from the surface apparatus 715 and/or from a surface operator. The control section 751 may control some operations of the modules and/or tools 761, 771, 731, 741 or 781 utilizing closed-loop algorithms implemented with a code executed by a controller (not shown) disposed in the control section 751. Thus, for example, a signal generated by one or more sensors of the downhole tool 711 may be analyzed, and one or more downhole actuators and/or other mechanisms or devices may be piloted and/or operated based on the signal.

Figure 8:
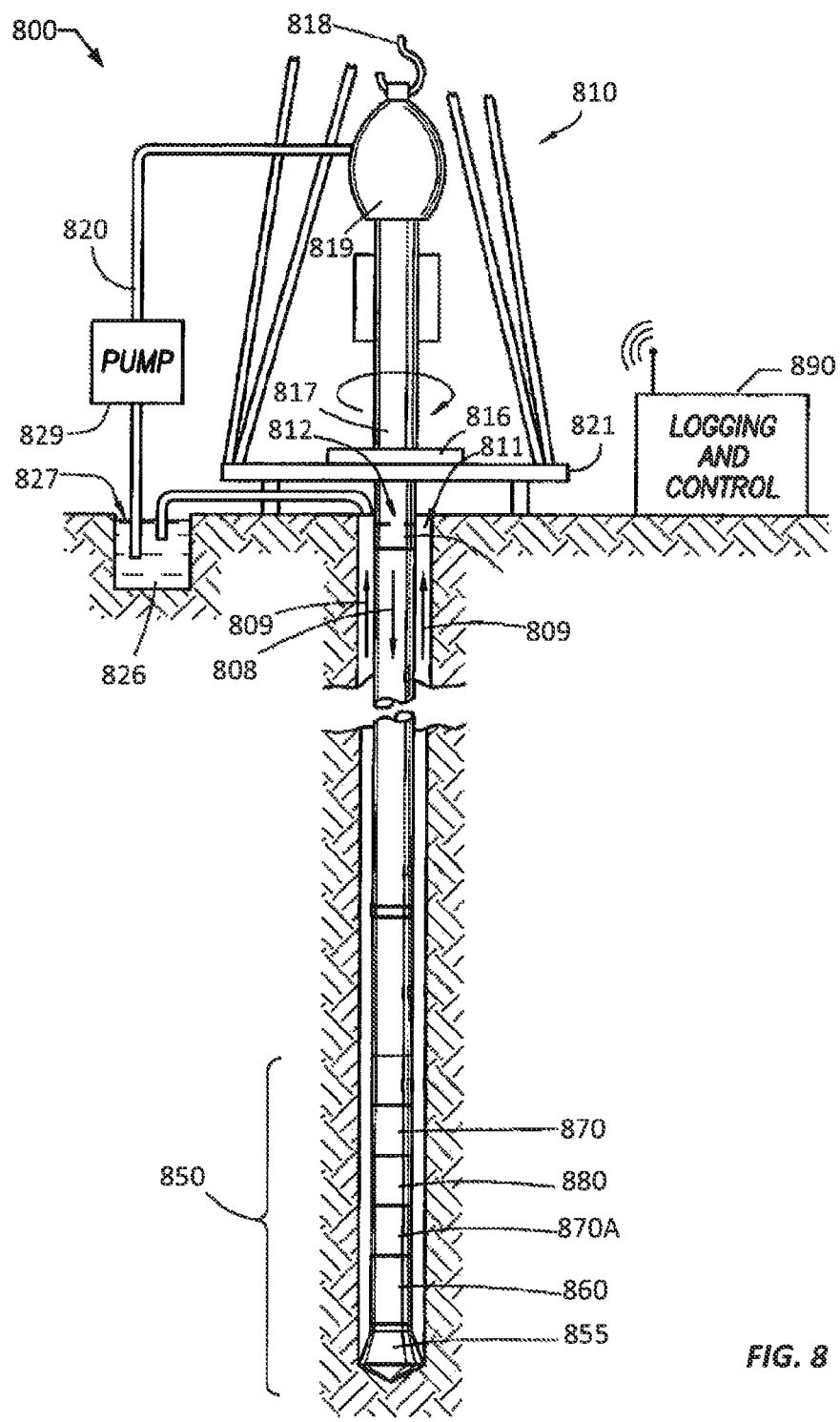
FIG. 8 is a schematic view of apparatus according to one or more aspects of the present disclosure.
Figure 9:
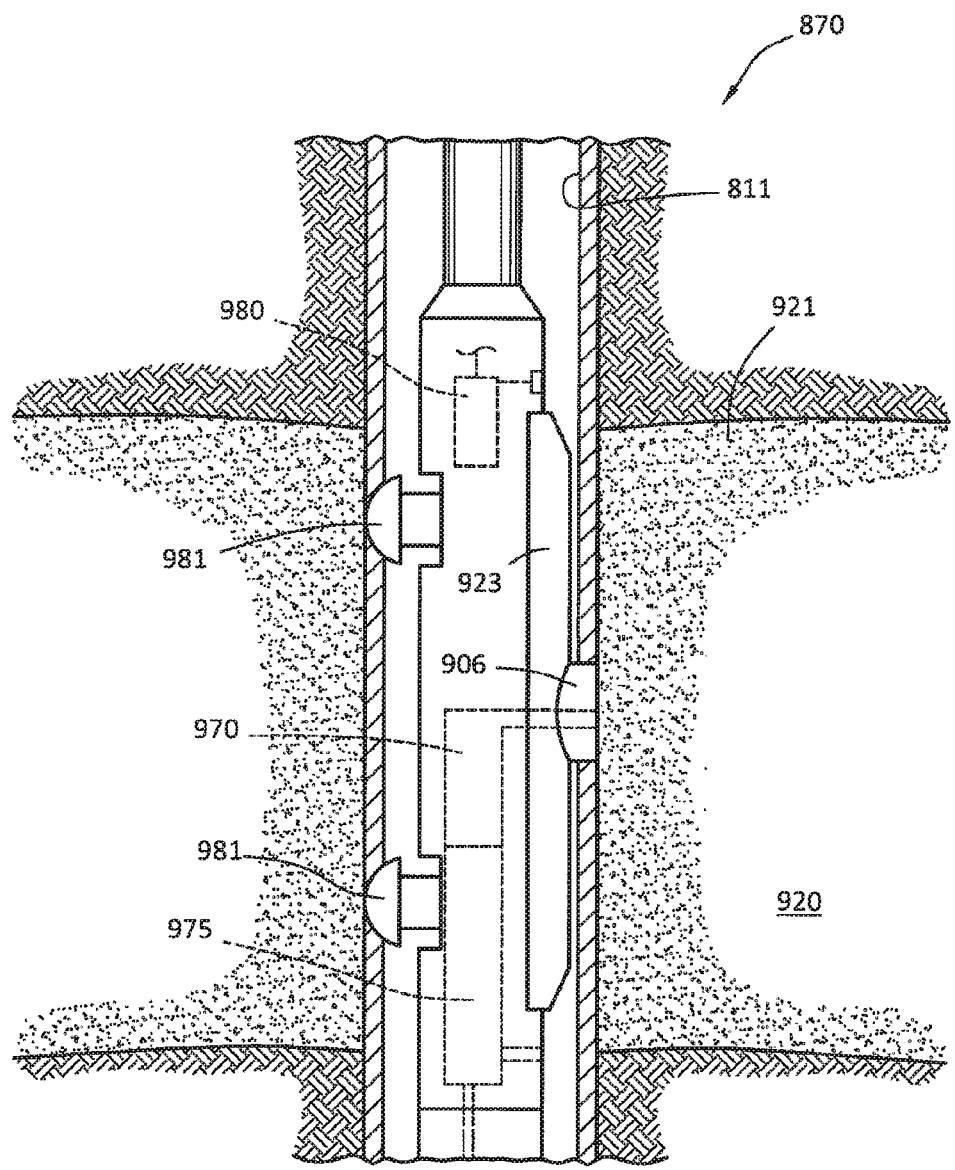
FIG. 9 is a schematic view of apparatus according to one or more aspects of the present disclosure.

Although FIGS. 2-7 schematically depict example embodiments in the context of wireline operations, it should be appreciated that methods and/or apparatus according to one or more aspects of the present disclosure are not limited to wireline deployment, but may be deployed in any other manner, such as via coiled tubing, drill pipe, wired drill pipe, slickline, and others. For example, FIGS. 8 and 9 depict schematic views of an example wellsite system that may also be used to implement one or more aspects of the present disclosure. In particular, the wellsite system may be used to inject a solvent and/or other fluid into a portion of a formation to lower the viscosity of hydrocarbon fluids therein and subsequently extract a mixture of the injected fluid and the treated formation fluid therefrom. The wellsite may be situated onshore (as shown) or offshore.

In the system of FIG. 8, a borehole 811 is drilled through subsurface formations by rotary drilling in a manner that is well known in the art. However, the present disclosure also contemplates others examples used in connection with directional drilling apparatus and methods.

As shown in FIG. 8, a tubular string 812 suspended within the borehole 811 may comprise a bottom hole assembly ("BHA") 850 proximate the lower end thereof. As also depicted, the BHA 850 may comprise a drill bit 855 at its lower end, although drill pipe and/or other tubular strings not comprising a drill bit are also contemplated. The surface portion of the wellsite system includes platform and derrick assembly 810 positioned over the borehole 811. The assembly 810 may comprise a rotary table 816, a kelly 817, a hook 818 and a rotary swivel 819. The tubular string 812 may be rotated by the rotary table 816, which itself may be operated by means that are well known and thus not shown. The rotary table 816 engages the kelly 817 at the upper end of the tubular string 812. The tubular string 812 is suspended from the hook 818. The hook 818 is attached to a traveling block (not shown) through the kelly 817 and the rotary swivel 819, which permits rotation of the tubular string 812 relative to the hook 818. As is well known, a top drive system (not shown) may alternatively be used instead of the kelly 817 and rotary table 816 to rotate the tubular string 812 from the surface.

In the example of FIG. 8, the surface system may further comprise drilling fluid ("mud") 826 stored in a tank or pit 827 formed at the wellsite. A pump 829 may deliver the drilling fluid 826 to the interior of the tubular string 812 via a port in the swivel 819, causing the drilling fluid 826 to flow downwardly through the tubular string 812 as indicated by the directional arrow 808. The drilling fluid 826 exits the tubular string 812 via water courses or nozzles ("jets") in the drill bit 855, and then circulates upward through the annulus region between the outside of the tubular string and the borehole sidewall, as indicated by the directional arrows 809. In this manner, the drilling fluid 826 may lubricate the drill bit 855 and carry formation cuttings up to the surface, whereupon the drilling fluid 826 may be cleaned and returned to the pit 827 for recirculation. As mentioned above, the drill bit 855 may be omitted and the bottom hole assembly 850 may be conveyed via tubing other than drill string, in which case the drilling fluid system may still be functional during testing/sampling operations according to one or more aspects of the present disclosure.

The bottom hole assembly 850 may comprise a logging-while-drilling (LWD) module 870, a measuring-while-drilling (MWD) module 880, a roto-steerable directional drilling system and hydraulically operated motor (collectively 860), and the drill bit 855. The LWD module 870 may be housed in a special type of drill collar, as is known in the art, and may comprise one or more well logging instruments. It will also be understood that more than one LWD module may be employed, e.g., as represented at 870A. Thus, references herein to a module at the position of the LWD module 870 may alternatively or additionally mean a module at the position of LWD module 870A. The LWD module 870 may comprise capabilities for measuring, processing, and storing information, as well as for communicating with the MWD 880. For example, the LWD module 870 may comprise one or more processors and/or other controllers operable to implement one or more aspects of the methods described herein. Similarly, the LWD module 870 may be operable for injection and/or sampling of fluid into and/or from the formation.

The MWD module 880 may also be housed in a special type of drill collar, as is known in the art, and may comprise one or more devices for measuring characteristics of the tubular string 812 and/or the drill bit 855. The MWD module 880 may further comprise an apparatus (not shown) for generating electrical power for the downhole portion of the wellsite system. Such apparatus may comprise a turbine generator powered by the flow of the drilling fluid 826, it being understood that other power and/or battery systems may be used while remaining within the scope of the present disclosure. The MWD 880 module may comprise one or more of the following types of measuring devices: a weight-on-bit measuring device, a torque measuring device, a vibration measuring device, a shock measuring device, a stick slip measuring device, a direction measuring device, and an inclination measuring device. The MWD module 880 may comprise capabilities for measuring, processing, and storing information, as well as for communicating with a logging and control unit 890. The logging and control unit 890 may comprise a controller having an interface configured to receive commands from a surface operator.

A simplified diagram of a while-drilling device (e.g., the LWD tool 870 in FIG. 8) is shown in FIG. 9. As shown in FIG. 9, the LWD tool 870 may comprise a stabilizer that may include one or more blades 923 configured to engage the sidewall of the borehole 811. The LWD tool 870 may also comprise one or more pistons and/or other actuators 981 operable to assist in applying a force to urge a sealing pad 906 and/or another portion of the LWD tool 870 against the sidewall of the borehole 811. Such operation to force the sealing pad 906 against the sidewall of the borehole 811 may be performed after a void 902 is formed in the sidewall. Such void may be created by any of the means described above or otherwise within the scope of the present disclosure, such as by extending a rotating drilling or coring bit into the sidewall. The means employed to form the void 902 may be part of the LWD tool 870, another portion of the tubular string 812, and/or other means.

The sealing pad 906 may protrude from the stabilizer blade 923 of the LWD tool 870 or otherwise be configured to, when urged into contact with the sidewall of the borehole 811, selectively seal off or isolate a portion of the sidewall, such as to fluidly couple to the adjacent formation 920 and/or to provide compression or mechanical pressure around the void 902, as described above. Once the sealing pad 906 fluidly couples to the adjacent formation 920, various measurements may be conducted such as, for example, a pretest parameter or a pressure parameter may be measured. A pump 975 of the LWD tool 870 may be utilized to inject solvent, dye and/or other fluid into the formation 920 and subsequently draw the resulting mixture of injected fluid and formation fluid into the LWD tool 870. When drawing fluid from the formation 920, the fluid may be expelled into the borehole 811 through a port (not shown) or it may be sent to one or more internal chambers 904. Optionally, the LWD tool 870 may comprise a fluid analysis module 970 through which the fluid mixture obtained from the formation 920 may flow, perhaps to measure properties of the extracted fluid mixture.

The LWD tool 870 may also comprise a downhole control system 980 configured to control the operations of the LWD tool 870. For example, the downhole control system 980 may be configured to control the injection of fluid into the formation 920 and/or the extraction of the resulting fluid mixture from the formation 920, such as may comprise controlling the pumping rate of the pump 975. The downhole control system 980 may also be configured to analyze and/or process data obtained, for example, from the fluid analysis module 970 or other downhole sensors (not shown), and perhaps to store and/or communicate measurement or processed data to the surface for subsequent analysis. For example, the downhole control system 980 may include a processor configured to implement one or more aspects of the methods described herein.

Figure 10:
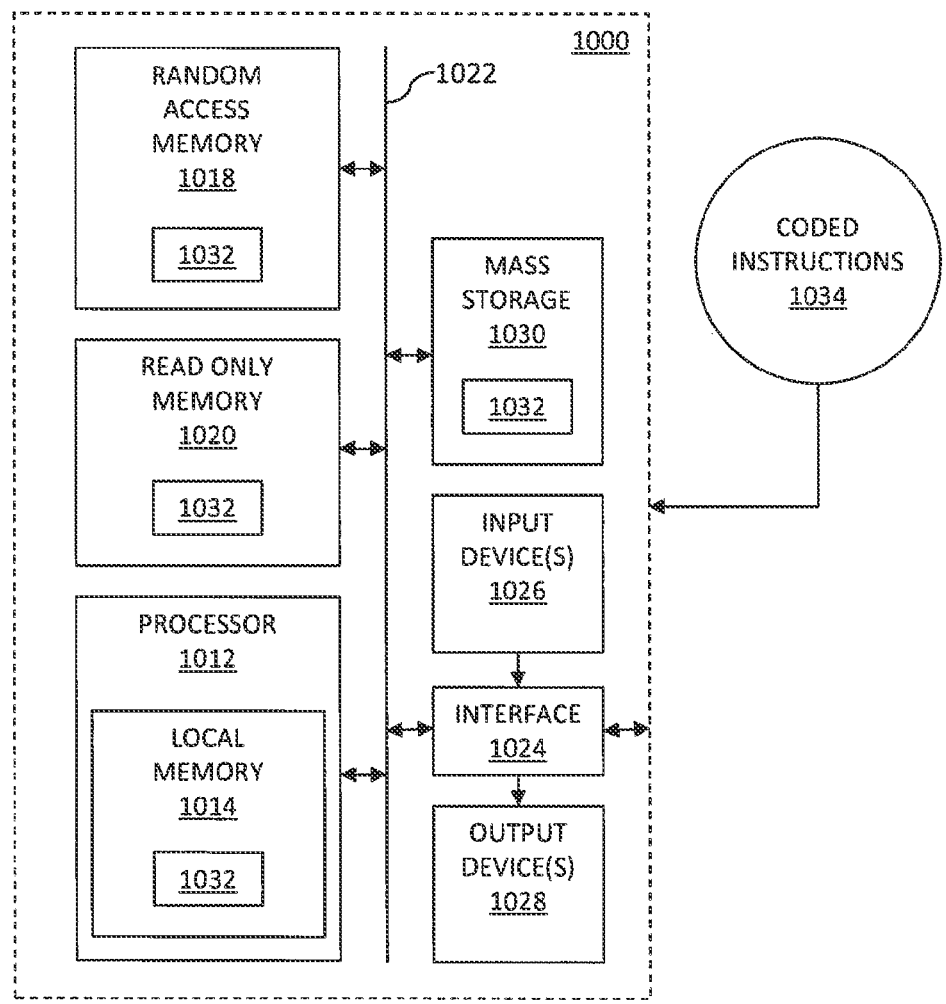
FIG. 10 is a schematic view of apparatus according to one or more aspects of the present disclosure.

FIG. 10 is a block diagram of an example processing system 1000 that may execute example machine-readable instructions used to implement one or more of the methods and/or processes described herein, and/or to implement the example downhole tools described herein. The processing system 1000 may be or comprise, for example, one or more processors, one or more controllers, one or more special-purpose computing devices, one or more servers, one or more personal computers, one or more personal digital assistant (PDA) devices, one or more smartphones, one or more internet appliances, and/or any other type(s) of computing device(s). Moreover, while it is possible that the entirety of the system 1000 shown in FIG. 10 is implemented within the downhole tool, it is also contemplated that one or more components or functions of the system 1000 may be implemented in surface equipment, including the surface equipment described above.

The system 1000 comprises a processor 1012 such as, for example, a general-purpose programmable processor. The processor 1012 includes a local memory 1014, and executes coded instructions 1032 present in the local memory 1014 and/or in another memory device. The processor 1012 may execute, among other things, machine-readable instructions to implement the methods and/or processes described herein. The processor 1012 may be, comprise or be implemented by any type of processing unit, such as one or more INTEL microprocessors, one or more microcontrollers from the ARM and/or PICO families of microcontrollers, one or more embedded soft/hard processors in one or more FPGAs, etc. Of course, other processors from other families are also appropriate.

The processor 1012 is in communication with a main memory including a volatile (e.g., random access) memory 1018 and a non-volatile (e.g., read only) memory 1020 via a bus 1022. The volatile memory 1018 may be, comprise or be implemented by static random access memory (SRAM), synchronous dynamic random access memory (SDRAM), dynamic random access memory (DRAM), RAMBUS dynamic random access memory (RDRAM) and/or any other type of random access memory device. The non-volatile memory 1020 may be, comprise or be implemented by flash memory and/or any other desired type of memory device. One or more memory controllers (not shown) may control access to the main memory 1018 and/or 1020.

The processing system 1000 also includes an interface circuit 1024. The interface circuit 1024 may be, comprise or be implemented by any type of interface standard, such as an Ethernet interface, a universal serial bus (USB) and/or a third generation input/output (3GIO) interface, among others.

One or more input devices 1026 are connected to the interface circuit 1024. The input device(s) 1026 permit a user to enter data and commands into the processor 1012. The input device(s) may be, comprise or be implemented by, for example, a keyboard, a mouse, a touchscreen, a trackpad, a trackball, an isopoint and/or a voice recognition system, among others.

One or more output devices 1028 are also connected to the interface circuit 1024. The output devices 1028 may be, comprise or be implemented by, for example, display devices (e.g., a liquid crystal display or cathode ray tube display (CRT), among others), printers and/or speakers, among others. Thus, the interface circuit 1024 may also comprise a graphics driver card.

The interface circuit 1024 also includes a communication device such as a modem or network interface card to facilitate exchange of data with external computers via a network (e.g., Ethernet connection, digital subscriber line (DSL), telephone line, coaxial cable, cellular telephone system, satellite, etc.).

The processing system 1000 also includes one or more mass storage devices 1030 for storing machine-readable instructions and data. Examples of such mass storage devices 1030 include floppy disk drives, hard drive disks, compact disk drives and digital versatile disk (DVD) drives, among others.

The coded instructions 1032 may be stored in the mass storage device 1030, the volatile memory 1018, the non-volatile memory 1020, the local memory 1014 and/or on a removable storage medium, such as a CD or DVD 1034.

As an alternative to implementing the methods and/or apparatus described herein in a system such as the processing system of FIG. 10, the methods and or apparatus described herein may be embedded in a structure such as a processor and/or an ASIC (application specific integrated circuit).

Figure 11:
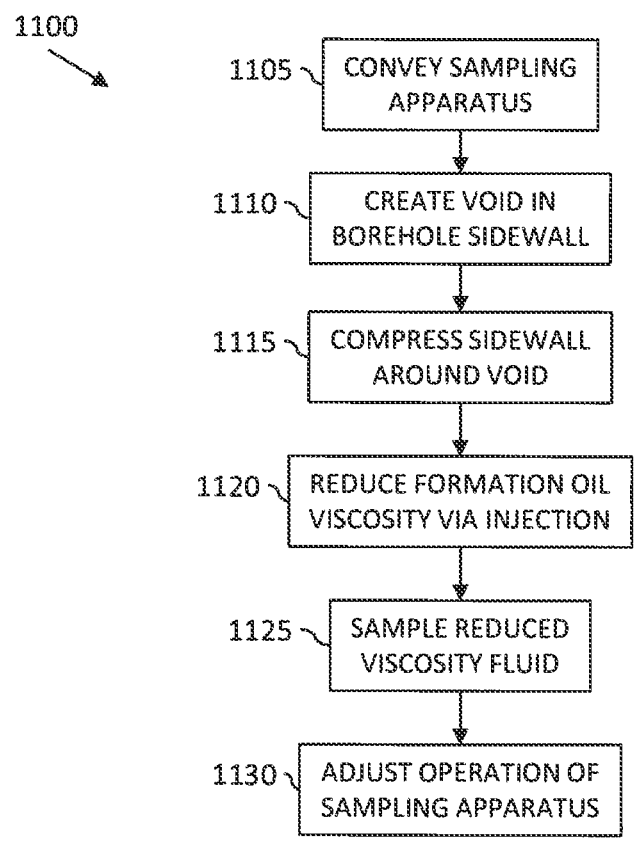
FIG. 11 is a flow-chart diagram of at least a portion of a method according to one or more aspects of the present disclosure.

FIG. 11 is a flow-chart diagram of one such method 1100 according to one or more aspects of the present disclosure. The method 1100 is one example of the implementation of the concepts described above, although other examples are also within the scope of the present disclosure. The method 1100 may be performed by apparatus as described above and shown in FIGS. 3-10, as well as other apparatus within the scope of the present disclosure.

The method 1100 may comprise conveyance 1105 of a downhole sampling apparatus within a borehole extending into a subterranean formation of interest. The sampling apparatus may be or comprise at least a portion of the downhole tool A shown in FIGS. 3 and 4, the downhole tool 212 shown in FIG. 5, the downhole tool 300 shown in FIG. 6, the downhole tool 711 shown in FIG. 7, and/or the LWD module 870 shown in FIGS. 8 and 9, and the conveyance may be via wireline and/or drillstring. The downhole sampling apparatus and/or its associated surface equipment may comprise at least a portion of the apparatus 1000 shown in FIG. 10. Downhole sampling apparatus having one or more aspects other than those shown in FIGS. 3-10 may also be within the scope of the present disclosure, as well as conveyance means other than wireline and drillstring. The subterranean formation may comprise heavy oil(s), although one or more aspects of the present disclosure may also be applicable or readily adaptable for utilization in formations containing other types of crude oil.

The method 1100 also comprises a borehole sidewall void creation 1110, such as may be performed via apparatus having one or more aspects similar to those shown in FIGS. 5 and 6, among others within the scope of the present disclosure. For example, the void may be the result of extending a rotating drilling or coring bit into the borehole sidewall, although other methods and/or means for creating the void are also within the scope of the present disclosure. After the void creation 1110, the method 1100 comprises a compression 1115 of at least a portion of the borehole sidewall surrounding the opening of the void. Such compression may be via a sealing pad, probe, and/or other component(s) of the downhole utilized for the void creation 1110. The compression 1115 may additionally be performed during the void creation 1110.

A formation oil viscosity reduction 1120 is then performed by injecting fluid into the formation through the void while maintaining the compression 1115. The injection fluid may be as described above, perhaps including water and/or one or more solvents. The injection fluid may also be heated by chemical, electrical, and/or other internal means of the downhole tool before the viscosity reducing injection 1120.

The method 1100 also comprises one or more samplings 1125 of the formation oil, although perhaps after allowing sufficient time for the injected fluid to reduce the viscosity of the formation oil. For example, a period of a few hours may elapse between the injection 1120 and the sampling 1125. The sampling 1125 may comprise operating a pump and/or other features of the downhole tool to withdraw the reduced viscosity oil into the tool via the void and a sealing pad and/or probe of the downhole tool. Other means for obtaining a formation fluid sample are also within the scope of the present disclosure.

Although not depicted in FIG. 11, the method 1100 may also comprise various measurements of the fluid drawn into the tool, perhaps including optical spectrometry measurements performed by an optical spectrometer of the downhole tool. Pressure, temperature, density, viscosity, and/or other types of measurements are also within the scope of the present disclosure. The method 1100 may also comprise performing one or more adjustments 1130 of an operational parameter of the downhole tool, perhaps based on one or more of such measurements. For example, such adjustment(s) 1130 may comprise initiating storage of a sample of the formation fluid flowing through the downhole sampling tool, and/or adjusting a rate of pumping of formation fluid into the downhole sampling tool, among other operational adjustments and/or other actions within the scope of the present disclosure.

In view of the entirety of the present disclosure, including the figures, one having ordinary skill in the art will readily recognize that the present disclosure introduces a method comprising: conveying a downhole tool within a borehole extending into a subterranean formation; creating a void in a sidewall of the borehole by extending a rotating member from the downhole tool into the sidewall; mechanically compressing a portion of the sidewall surrounding the void; reducing viscosity of hydrocarbons in the subterranean formation proximate the void by injecting a fluid from the downhole tool into the formation via the void; and drawing fluid comprising the reduced viscosity hydrocarbons from the subterranean formation into the downhole tool. Conveying the downhole tool within the borehole may be via wireline or tubular string.

The rotating member may comprise a drill bit. The rotating member may also or additionally comprise a coring bit, wherein creating a void in the sidewall comprises removing a core from the sidewall.

Mechanically compressing the sidewall portion surrounding the void may comprise urging a sealing pad of the downhole tool against the sidewall portion. The rotating member may extend from the downhole tool through a central aperture of the sealing pad.

Mechanically compressing the sidewall portion surrounding the void may comprise expanding a packer into engagement with the sidewall portion. The packer may comprise a port in fluid communication with the void, wherein injecting the fluid from the downhole tool into the subterranean formation via the void may comprise injecting fluid through the port, and wherein drawing fluid from the subterranean formation into the downhole tool may comprise drawing fluid through the port.

Injecting the fluid from the downhole tool into the subterranean formation via the void may comprise operating a pump of the downhole tool, and drawing fluid comprising the reduced viscosity hydrocarbons from the subterranean formation into the downhole tool may comprise further operating the pump.

Injecting a fluid from the downhole tool into the subterranean formation via the void may comprise injecting a fluid carried by the downhole tool in an internal sample chamber of the downhole tool.

Injecting the fluid from the downhole tool into the subterranean formation via the void may comprise injecting the fluid at a pressure greater than a fracture gradient of the subterranean formation.

The method may further comprise orienting the downhole tool within the borehole such that the void is created in a plane containing the highest two principle stresses in the borehole at the depth of the void.

The injected fluid may partially comprise at least one of heated water or organic solvent. The downhole tool may comprise an internal sample chamber carrying injection fluid, and the method may further comprise activating a heater of the downhole tool to heat the injection fluid before it is injected into the formation via the void. The injected fluid may comprise a dye that is soluble in the hydrocarbons. The injected fluid may comprise a solvent having a peak absorbance within a range of an optical spectrometer of the downhole tool. The injected fluid may comprise carbon disulfide and/or dimethyl ether.

The method may further comprise measuring an optical spectrum of the fluid drawn into the downhole tool from the subterranean formation, and measuring the optical spectrum may utilize an optical spectrometer of the downhole tool. The method may further comprise estimating concentrations of different components in the reduced viscosity hydrocarbons drawn from the subterranean formation into the downhole tool, and estimating the concentrations of different components in the reduced viscosity hydrocarbons may be at least partially based on the measured optical spectrum. The injected fluid may comprise an optical dye detectable by the optical spectrometer. The method may further comprise estimating a dilution of the reduced viscosity hydrocarbons drawn from the subterranean formation based on measured optical spectra of the optical dye. The optical dye may exhibit absorption in the optical spectrometer at a wavelength ranging between about 0.3 and about 2.5 microns. The optical dye may be soluble in the hydrocarbons in the subterranean formation and in the fluid injected into the subterranean formation.

The present disclosure also introduces an apparatus comprising: a downhole tool conveyable within a borehole extending into a subterranean formation, wherein the downhole tool comprises: a first member that is rotatable and extendable from the downhole tool into a sidewall of the borehole to create a void in the sidewall; a second member operable to exert mechanical pressure on a portion of the sidewall adjacent the void; at least one internal chamber; and a pump operable to pump injection fluid from the at least one internal chamber into the subterranean formation via the void. The downhole tool may be conveyable within the borehole via wireline or tubular string.

The first member may comprise a drill bit and/or a coring bit. The second member may comprise a sealing pad. The first member may extend from the downhole tool through a central aperture of the sealing pad.

The pump may be operable to pump the injection fluid from the at least one internal chamber into the subterranean formation at a pressure greater than a fracture gradient of the subterranean formation.

The injection fluid may partially comprise at least one of heated water or organic solvent. The downhole tool may further comprise a heater to heat the at least one of heated water or organic solvent before it is injected into the subterranean formation.

The injection fluid may comprise a dye that is soluble in hydrocarbons within the subterranean formation. The injection fluid may also or alternatively comprise carbon disulfide and/or dimethyl ether.

The downhole tool may further comprise an optical spectrometer, and the injection fluid may comprise a solvent having a peak absorbance within a range of the optical spectrometer. The injection fluid may further comprise an optical dye detectable by the optical spectrometer. The optical dye may exhibit absorption in the optical spectrometer at a wavelength ranging between about 0.3 and about 2.5 micron. The optical dye may be soluble in hydrocarbons within the subterranean formation and/or in the injection fluid.

The pump may be further operable to draw fluid from the subterranean formation into the at least one internal chamber via the void, and the drawn fluid may comprise a mixture of the injection fluid and subterranean formation hydrocarbons having a viscosity reduced by the injection fluid. The at least one internal chamber may comprises a first chamber and a second chamber, and the pump may be operable to pump the injection fluid from the first chamber and draw the mixture into the second chamber.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same aspects of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. §1.72(b) to allow the reader to quickly ascertain the nature of the technical disclosure. It is submitted with the understanding that it will not be used to interpret or limit the scope or meaning of the claims.

What is claimed is:

1. A method, comprising:
    conveying a downhole tool within a borehole extending into a subterranean formation;
    creating a void in a sidewall of the borehole by extending a rotating member from the downhole tool into the sidewall; and
    orienting the downhole tool within the borehole such that the void is created in a plane containing the highest two principle stresses in the borehole at the depth of the void;
    mechanically compressing a portion of the sidewall surrounding the void;
    reducing viscosity of hydrocarbons in the subterranean formation proximate the void by injecting a fluid from the downhole tool into the formation via the void;
    drawing fluid comprising the reduced viscosity hydrocarbons from the subterranean formation into the downhole tool.

2. The method of claim 1 wherein conveying the downhole tool within the borehole is via wireline or tubular string.

3. The method of claim 1 wherein the rotating member comprises a drill bit.

4. The method of claim 1 wherein the rotating member comprises a coring bit, and wherein creating a void in the sidewall comprises removing a core from the sidewall.

5. The method of claim 1 wherein mechanically compressing the sidewall portion surrounding the void comprises urging a sealing pad of the downhole tool against the sidewall portion.

6. The method of claim 5 wherein the rotating member extends from the downhole tool through a central aperture of the sealing pad.

7. The method of claim 1 wherein mechanically compressing the sidewall portion surrounding the void comprises expanding a packer into engagement with the sidewall portion.

8. The method of claim 7 wherein the packer comprises a port in fluid communication with the void, wherein injecting the fluid from the downhole tool into the subterranean formation via the void comprises injecting fluid through the port, and wherein drawing fluid from the subterranean formation into the downhole tool comprises drawing fluid through the port.

9. The method of claim 1 wherein injecting the fluid from the downhole tool into the subterranean formation via the void comprises operating a pump of the downhole tool, and wherein drawing fluid comprising the reduced viscosity hydrocarbons from the subterranean formation into the downhole tool comprises further operating the pump.

10. The method of claim 1 wherein injecting a fluid from the downhole tool into the subterranean formation via the void comprises injecting a fluid carried by the downhole tool in an internal sample chamber of the downhole tool.

11. The method of claim 1 wherein injecting the fluid from the downhole tool into the subterranean formation via the void comprises injecting the fluid at a pressure greater than a fracture gradient of the subterranean formation.

12. The method of claim 1 wherein the injected fluid partially comprises at least one of heated water or organic solvent.

13. The method of claim 12 wherein the downhole tool comprises an internal sample chamber carrying injection fluid, and wherein the method further comprises activating a heater of the downhole tool to heat the injection fluid before it is injected into the formation via the void.

14. The method of claim 1 wherein the injected fluid comprises a dye that is soluble in the hydrocarbons.

15. The method of claim 1 wherein the injected fluid comprises a solvent having a peak absorbance within a range of an optical spectrometer of the downhole tool.

16. The method of claim 1 wherein the injected fluid comprises carbon disulfide.

17. The method of claim 1 wherein the injected fluid comprises dimethyl ether.

18. The method of claim 1 further comprising measuring an optical spectrum of the fluid drawn into the downhole tool from the subterranean formation, wherein measuring the optical spectrum utilizes an optical spectrometer of the downhole tool.

19. The method of claim 18 further comprising estimating concentrations of different components in the reduced viscosity hydrocarbons drawn from the subterranean formation into the downhole tool, wherein estimating the concentrations of different components in the reduced viscosity hydrocarbons is at least partially based on the measured optical spectrum.

20. The method of claim 18 wherein the injected fluid comprises an optical dye detectable by the optical spectrometer.

21. The method of claim 20 further comprising estimating a dilution of the reduced viscosity hydrocarbons drawn from the subterranean formation based on measured optical spectra of the optical dye.

* * * * *